United States Patent Office 3,352,853
Patented Nov. 14, 1967

3,352,853
17β-(SUBSTITUTED-OXY)-3-OXYGENATED-5α-ANDROST-1-ENES
Paul M. Klimstra, Northbrook, Ill., assignor to G. D. Searle & Co., Chicago, Ill., a corporation of Delaware
No Drawing. Filed May 13, 1965, Ser. No. 455,602
5 Claims. (Cl. 260—239.55)

This application is a continuation-in-part of my copending application Ser. No. 208,954, filed July 10, 1962, now Pat. No. 3,257,428.

The present invention is concerned with novel 17-(substituted-oxy) steroids, and, more particularly, with 17β-(substituted-oxy)-3-oxygenated-5α-androst-1-enes of the structural formula

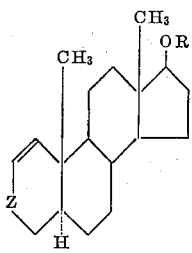

wherein R is a tetrahydropyran-2-yl or p-tertiary-butylphenoxyacetyl radical and Z can be a carbonyl, β-hydroxymethylene or β-(lower alkanoyl)oxymethylene radical.

Examples of lower alkanoyl radicals therein depicted are formyl, acetyl, propionyl, butyryl, valeryl, caproyl, heptanoyl, and the branched-chain radicals isomeric therewith.

A starting material suitable for utilization in the manufacture of the instant compounds is 17β-hydroxy-5α-androst-1-en-3-one. Reaction of that substance with dihydropyran in the presence of an acid catalyst such as p-toluenesulfonic acid or hydrogen chloride results in the corresponding 17β-tetrahydropyran-2-yloxy derivative, i.e., 17β-tetrahydropyran-2-yloxy-5α-androst-1-en-3-one.

Reduction of the instant 3-keto compounds with a suitable chemical reducing agent results in the corresponding instant 3β-hydroxy derivatives. For example, the reduction of 17β-tetrahydropyran-2-yloxy-5α-androst-1-en-3-one with lithium aluminum hydride in ether affords 17β-tetrahydropyran-2-yloxy-5α-androst-1-en-3β-ol.

Acylation of the instant 3-hydroxy compounds with a lower alkanoic acid anhydride or halide in the presence of a suitable acid acceptor produces the corresponding 3-(lower alkanoyl)oxy compounds. The aforementioned 17β-tetrahydropyran-2-yloxy-5α-androst-1-en-3β-ol, for example, is allowed to react with acetic acid in pyridine to yield 17β-tetrahydropyran-2-yloxy-5α-androst-1-en-3β-ol 3-acetate.

The compounds of this invention exhibit valuable pharmacological properties. They are hormonal and antihormonal agents, for example, as evidenced by their anabolic, androgenic and anti-estrogenic properties and possess the particular advantage of low anti-fertility side effects.

The following examples describe in detail compounds illustrative of the present invention and methods which have been devised for their preparation. However, the invention is not to be construed as limited thereby either in spirit or in scope since it will be apparent to those skilled in the art of organic synthesis that many modifications both of materials and of methods may be practiced without departing from the purpose and intent of this disclosure. Throughout the examples hereinafter set forth, temperatures are given in degrees centigrade (° C.) and relative amounts of materials are in parts by weight except as otherwise noted.

Example 1

To a solution of 20 parts of 17β-hydroxy-5α-androst-1-en-3-one in 30 parts of methylene chloride containing 22.2 parts of dihydropyran is added 0.01 part of p-toluenesulfonic acid, and the resulting reaction mixture is stored at room temperature for about three days. That mixture is then washed successively with water and 5% aqueous sodium bicarbonate, following which time it is dried over anhydrous potassium carbonate containing decolorizing carbon. Removal of the solvent by distillation under reduced pressure affords a yellow oily residue which is purified by recrystallization from aqueous methanol to afford pure 17β-tetrahydropyran-2-yloxy-5α-androst-1-en-3-one, melting at about 94–96°. A structural representation of this compound is shown below.

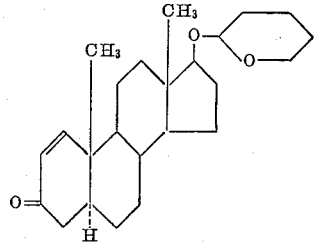

Example 2

To a slurry of 13 parts of lithium aluminum hydride in 170 parts of ether is added, with stirring over a period of about 2 hours, a solution of 25 parts of 17β-tetrahydropyran-2-yloxy-5α-androst-1-en-3-one in 175 parts of ether. Stirring of the reaction mixture is continued at room temperature for about 2 hours. The excess reagent is destroyed by careful addition of aqueous acetone, and the resulting mixture is then poured carefully into ice and water. The layers are separated, and the aqueous layer is extracted with ether. The combined organic solutions are then washed several times with water, dried over anhydrous potassium carbonate containing decolorizing carbon and distilled to dryness to afford an oily residue. That crude product is purified by recrystallization first from aqueous methanol, then from hexane to yield pure 17β-tetrahydropyran-2-yloxy-5α-androst-1-en-3β-ol, melting at about 130–133°. This compound is characterized also by the following structural formula

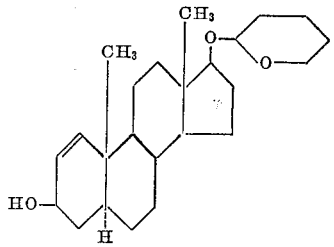

Example 3

A solution containing 15 parts of 17β-tetrahydropyran-2-yloxy-5α-androst-1-en-3β-ol, 216 parts of pyridine and 119 parts of acetic anhydride is kept at room temperature for about 16 hours, then is poured carefully into water. The resulting aqueous mixture is extracted with ether, and the ether layer is separated, then washed successively with 5% aqueous sodium bicarbonate, dilute hydrochloric acid and 5% aqueous sodium bicarbonate. Drying over anhydrous potassium carbonate containing decolorizing carbon affords a solution which is distilled to dryness under reduced pressure to afford, as an oil, 17β-tetrahydropyran-2-yloxy-5α-androst-1-en-3β-ol 3-acetate. It is characterized further by infrared absorption maxima, in chloroform, at about 2.75, 3.41, 5.78, 6.01 and 7.98 microns. This compound is further characterized by the following structural formula

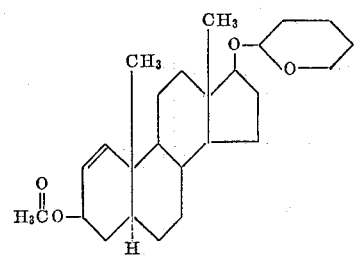

Example 4

To a solution of 7.5 parts of 17β-hydroxy-5α-androst-1-en-3-one in 73.5 parts of pyridine is added, at 0–5° with rapid stirring, 8 parts of p-tertiary-butyl-phenoxyacetyl chloride dropwise over a period of about 5 minutes. The reaction mixture is stirred at room temperature for about 6 hours, then is poured carefully into ice and water. Extraction of that aqueous mixture with ether affords an organic solution which is washed successively with water, 5% hydrochloric acid, and water, then dried over anhydrous sodium sulfate containing decolorizing carbon. Removal of the solvent by distillation under reduced pressure affords a viscous oily residue which is extracted into benzene. The resulting organic solution is chromatographed on silica gel and the chromatographic column is eluted with 5% ethyl acetate in benzene to afford the crude product. Recrystallization of that material from acetone results in pure 17β-(p-tertiary-butylphenoxyacet)oxy-5α-androst-1-en-3-one, melting at about 158.5–160°. It exhibits an optical rotation, in chloroform, of +41° and also an ultraviolet absorption maximum at about 222.5 millimicrons with a molecular extinction coefficient of about 20,000, and is characterized further by the following structural formula

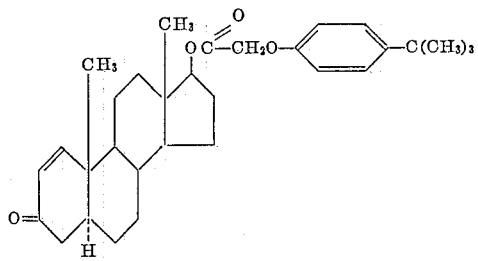

Example 5

By substituting an equivalent quantity of propionic anhydride and otherwise proceeding according to the processes described in Example 3, there is obtained 17β-tetrahydropyran-2-yloxy-5α-androst-1-en-3β-ol 3-propionate.

What is claimed is:
1. A compound of the formula

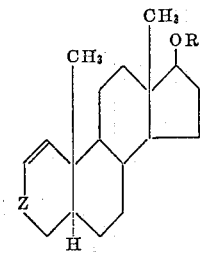

wherein Z is a member of the class consisting of carbonyl, β-hydroxymethylene and β-(lower alkanoyl)oxymethylene radicals, and R is selected from the group consisting of tetrahydropyran-2-yl and p-tertiary-butylphenoxyacetyl radicals.

2. 17β-tetrahydropyran-2-yloxy-5α-androst-1-en-3β-ol.
3. 17β-tetrahydropyran-2-yloxy-5α-androst-1-en-3-one.
4. 17β-tetrahydropyran-2-yloxy-5α-androst-1-en-3β-ol 3-acetate.
5. 17β-(p-tertiary-butylphenoxyacet)oxy-5α-androst-1-en-3-one.

References Cited

UNITED STATES PATENTS

| | | | |
|---|---|---|---|
| 2,888,474 | 5/1959 | Ringold et al. | 260—397.45 |
| 3,167,547 | 1/1965 | Cross | 260—239.55 |
| 3,200,115 | 8/1965 | Cross | 260—239.55 |

FOREIGN PATENTS

| | | |
|---|---|---|
| 1,079,040 | 4/1960 | Germany. |

ELBERT L. ROBERTS, *Primary Examiner.*

H. A. FRENCH, *Assistant Examiner.*